United States Patent
Sau

(10) Patent No.: US 6,900,255 B2
(45) Date of Patent: May 31, 2005

(54) SUPPRESSION OF AQUEOUS VISCOSITY OF NONIONIC ASSOCIATIVE THICKENERS

(75) Inventor: Arjun C. Sau, Newark, DE (US)

(73) Assignee: Hercules Incorporated, Wilmington, DE (US)

(*) Notice: Subject to any disclaimer, the term of this patent is extended or adjusted under 35 U.S.C. 154(b) by 47 days.

(21) Appl. No.: 10/439,920

(22) Filed: May 16, 2003

(65) Prior Publication Data

US 2004/0229998 A1 Nov. 18, 2004

(51) Int. Cl.$^7$ ............... C08L 3/02; C08L 5/16
(52) U.S. Cl. ............... 524/48; 524/38; 524/44; 106/176; 106/217
(58) Field of Search ............... 524/38, 44, 48; 106/176, 217

(56) References Cited

U.S. PATENT DOCUMENTS

| | | | |
|---|---|---|---|
| 4,288,639 A | 9/1981 | Camp | 568/625 |
| 4,354,956 A | 10/1982 | Camp | 252/316 |
| 4,411,819 A | 10/1983 | Panck et al. | 252/315.1 |
| 4,649,224 A | 3/1987 | Panck et al. | 568/624 |
| 4,673,518 A | 6/1987 | Owens et al. | 252/75 |
| 4,904,466 A | 2/1990 | Carson et al. | 424/76.3 |
| 5,137,571 A * | 8/1992 | Eisenhart et al. | 106/162.8 |
| 5,376,709 A * | 12/1994 | Lau et al. | 524/48 |
| 5,425,806 A | 6/1995 | Doolan et al. | 106/203 |
| 5,574,127 A | 11/1996 | Sau | 528/125 |
| 5,627,232 A | 5/1997 | Glancy et al. | 524/590 |
| 5,629,373 A | 5/1997 | Glancy et al. | 524/512 |
| 5,728,895 A | 3/1998 | Wiggins et al. | 568/601 |
| 5,880,222 A | 3/1999 | Wiggins et al. | 525/407 |
| 5,914,373 A | 6/1999 | Glancy et al. | 525/406 |
| 5,916,935 A | 6/1999 | Wiggins et al. | 523/335 |
| 6,020,407 A | 2/2000 | Campbell et al. | 524/156 |
| 6,057,388 A | 5/2000 | Wiggins et al. | 523/335 |
| 6,150,445 A | 11/2000 | Bostrom et al. | 524/378 |
| 2003/0171459 A1 | 9/2003 | Sau | 524/58 |

FOREIGN PATENT DOCUMENTS

| WO | WO 01/12712 | 2/2001 | C08K/5/05 |
|---|---|---|---|

* cited by examiner

*Primary Examiner*—James J. Seidleck
*Assistant Examiner*—U. K. Rajguru
(74) *Attorney, Agent, or Firm*—David Edwards

(57) ABSTRACT

A composition is composed of a hydrophobically modified aminoplast polyether or hydrophobically modified non-urethane polyethers with a viscosity suppressing agent of cyclodextrins or derivatives thereof. A method for improving the pumpability and pourability of aqueous solutions of thickener of a hydrophobically modified aminoplast polyether or hydrophobically modified non-urethane polyethers which is provided by admixing a cyclodextrin with the thickener to form a complex of the cyclodextrin and thickener where the viscosity of the thickener is suppressed and adding the complexed admixture to an aqueous system containing a water-insoluble polymer wherein the cyclodextrin is decomplexed and the thickener becomes an effective thickener. An example of the uses for this composition and method is in film forming coatings such as latex paints.

24 Claims, No Drawings

SUPPRESSION OF AQUEOUS VISCOSITY OF NONIONIC ASSOCIATIVE THICKENERS

FIELD OF INVENTION

This invention relates to controlling the solution viscosity and other rheological properties of associative thickeners in aqueous media. More particularly, this invention relates to controlling the viscosity of high solids solution of aminoplast-polyether and non-urethane associative thickeners.

BACKGROUND OF THE INVENTION

Highly filled aqueous systems, such as water-borne coatings (latex or emulsion paints), inks, construction materials, and cosmetics are formulated with hydrophobically modified water-soluble polymers (HM-WSPs) to control the rheology of coatings during manufacturing, storage and applications. These HM-WSPs are commonly referred to in the art as "associative thickeners". They are so called because they thicken the latex paints by forming a three-dimensional network through intermolecular associations of the hydrophobic moieties present in the HM-WSP chains and/or with other hydrophobic components present in the coatings formulation. Water-borne architectural coatings are used for on-site application to interior or exterior surfaces of residential, commercial, institutional, or industrial buildings. Associative thickeners have become the industry standards as the rheology modifiers in paints because they have a number of advantages over conventional thickener systems. These include: (1) a lower viscosity during incorporation, (2) a lower tendency to spatter during application, (3) good flow and leveling upon application, (4) better color, (5) higher gloss through less flocculation, (6) lower sensitivity of the coatings to water, (7) less vulnerability to microbial degradation, and (8) minimal reduction in the viscosity of the thickened dispersions on exposure to shearing (approaching Newtonian flow behavior).

These associative thickeners pose considerable difficulties to disperse or dissolve them in water or rapidly incorporate them into waterborne coatings formulations. When the powder form of these thickeners is added directly into a water-borne coating formulation, for example, latex paint, they form lumps or globules and do not completely dissolve even after mixing for a long time. This behavior of these thickeners is undesirable for coatings manufacturing as their thickeners slow down the manufacturing process. To eliminate these problems, these thickeners are sold as high solids solutions in water or in a mixture of water and an organic co-solvent, such as butyl carbitol or propylene glycol. The function of these organic co-solvents is to suppress the viscosity of the aqueous solution containing the associative thickener to allow for ease of handling before it is used as a thickener. While these organic co-solvents perform their intended function, they possess potential environmental, safety, and health problems. These organic co-solvents contribute to volatile organic compounds (VOCs) which are not environmentally friendly. Since these VOCs potentially harm the atmosphere, environmentalists are getting bills passed in the Government in order to reduce the VOCs emitted into the atmosphere. Hence, companies that produce or market formulations that produce large volumes of VOCs are being required either to reduce the level of VOCs or to eliminate them all together. Companies in the paint industry are now concerned about VOCs and are asking their raw materials suppliers to provide environmentally friendly products with low or no VOCs.

One approach to suppress the aqueous viscosity of associative thickeners and yet be environmentally friendly is to use surfactants in the paint. Although this presents no specific health or environmental hazard, it does degrade formulation performance. U.S. Pat. Nos. 5,425, 806, 6,020, 407 (issued to Rheox, Inc.) and U.S. Pat. No. 6,150,445 (issued to Akzo Nobel AV) describe the use of surfactants, which owing to their micelle-forming capability can reduce the viscosity of the aqueous concentrate of the associative thickener.

Another approach is described in U.S. Pat. Nos. 5,137,571 and 5,376,709 that disclose the use of cyclodextrins or their derivatives to suppress the solution viscosity of hydrophobically modified ethoxylated polyurethanes, hydrophobically modified alkali-soluble emulsions, hydrophobically modified hydroxyethylcellulose, or hydrophobically modified polyacrylamides.

U.S. Pat. Nos. 5,916,935 and 6,057,398 describes the preparation of a concentrated solution of thickeners by forming an admixture of a non-urethane associative thickener compound and surfactants in conjunction with water and an organic solvent and subsequently azeotropically distilling off the organic solvent. The associative thickener solution thus obtained is typically essentially free of VOCs.

Another approach is to reduce the molecular weight of the associative thickener so that no viscosity suppressant is needed to prepare high solids solutions in water with manageable viscosity.

Recently, the compositions and applications of a new class of associative thickeners based on hydrophobically modified poly(acetal- or ketal-polyether) were described in U.S. Pat. Nos. 5,574,127 and 6,162,877. Compared to many existing associative thickeners (see U.S. Pat. No. 5,574,127), these polymers were useful as rheology modifiers for highly filled aqueous systems at very high pHs to provide the desired properties. However, like many high molecular weight associative thickeners, these polymers exhibit high viscosity at high solids solutions in water. Consequently, their use in many commercial applications is restricted. U.S. patent application Ser. No. 10/003,755, filed Oct. 29, 2001 describes the suppression of the solution viscosity of hydrophobically modified poly(acetal- or ketal-polyethers) with cyclodextrins.

Therefore, to widen the utility of these associative thickeners, it is desirable to develop means to lower their high solids solution viscosity. The present invention is directed to address this issue with other commercial synthetic associative thickeners having different chemical compositions.

SUMMARY OF THE INVENTION

The present invention is directed to a composition comprising an aqueous solution of a) a hydrophobically modified aminoplast-polyether or non-urethane polyether and b) a viscosity suppressing agent selected from cyclodextrins and derivatives thereof.

This invention also relates to a method for improving the pumpability and pourability of aqueous solutions of an associative thickener selected from the group consisting of hydrophobically modified aminoplast-polyethers described in U.S. Pat. Nos. 5,627,232, 5,629373, 5,914,373 (issued to United Catalysts, Inc.), WO 01/12712 (applied by Sud-Chemie, Inc.) and nonurethane polyether thickeners described in U.S. Pat. Nos. 4,288,639, 4,354,956, 4,411,819, 4,673,518, 4,649,224, 4,904,466 (issued to BASF Corporation) and U.S. Pat. Nos. 5,728, 895, 5,880,222, 5,916,935, & 6,057,388 (issued to Henkel Corporation) comprising admixing a cyclodextrin with the associative thickener to form a complex of the associative thickener where the viscosity of the associative thickener is suppressed and adding the complexed admixture to an aqueous system containing a water-insoluble polymer wherein the cyclodextrin is decomplexed and the associative thickener becomes an effective thickener.

DETAILED DESCRIPTION OF THE INVENTION

It has been surprisingly found that blends of a hydrophobically modified aminoplast-polyether described in U.S. Pat. Nos. 5,627,232, 5,629,373, 5,914,373 and WO 01/12712 or non-urethane polyether thickeners described in U.S. Pat. Nos. 4,288,639, 4,354,956, 4,354,956, 4,411,819, 4,673,518, 4,904,466, 5,728,895, 5,880,222, 5,916,935, and 6,057,388 and cyclodextrin can make a high solids, low viscosity blend that when added to an aqueous medium can form pumpable and pourable slurries or solutions at low water concentrations all the way up to substantially clear homogeneous solutions at medium to high water concentrations.

The polymers of this invention are substantially completely soluble in water at ambient temperatures and have been found to efficiently thicken various water-based systems including latex paints. They also provide an improved combination of paint properties (stability, flow and leveling, film build, spatter resistance, and sag resistance). These polymers described in U.S. Pat. Nos. 4,288,639, 4,354,956, 4,354,956, 4,411,819, 4,673,518, 4,904,466, 5,728, 895, 5,880,222, 5,916,935, and 6,057,388 are associative thickeners that either have a backbone of aminoplast-polyether or polyether with ends that are capped with hydrophobic groups.

The preparations of various hydrophobically modified aminoplast polyethers associated with the present invention are described in U.S. Pat. Nos. 5,627,232, 5,629,373, 5,914,373 and WO 01/12712 and their disclosures are herein incorporated by reference.

The preparations of various non-urethane thickeners associated with the present invention are described in U.S. Pat. Nos. 4,288,639, 4,354,956, 4,354,956, 4,411,819, 4,673,518, 4,904,466, 5,728, 895, 5,880,222, 5,916,935, and 6,057,388 12712 and their disclosures are herein incorporated by reference.

Cyclodextrins (CDs) are cyclic oligosaccharides with six to twelve alpha-D-anhydroglucose units connected together by alpha-(1,4) linkages. They are well known in the art and commercially available. The cyclodextrins composed of six, seven and eight anhydroglucose rings are referred to as alpha ($\alpha$)-, beta ($\beta$)- and gamma ($\gamma$)-cyclodextrin respectively. These truncated cone-shaped molecules are characterized by having a hydrophobic cavity and a relatively hydrophilic exterior. One of the unique properties of CDs is their ability to include appropriate hydrophobic compounds in their cavity to form host-guest complexes.

Cyclodextrins are produced from starch of any selected plant variety, such as corn, potato, waxy maize, and the like which may be modified or unmodified starch derived from cereal or tuber origin and the amylose or amylopectin fractions thereof. The selected starch in the form of an aqueous slurry, at concentrations up to about 35% by weight solids, is usually liquefied, by gelatinization or treatment with a liquefying enzyme such as bacterial alpha-amylase enzyme, and then subjected to treatment with a glycosyl-transferase to form the cyclodextrins. The amount of individual alpha-, beta-, and gamma-cyclodextrin formed will vary depending on the selected starch, selected glycosyl-transferase and processing conditions. Precipitation and separation of the individual cyclodextrins are described in the literature using solvent systems, inclusion compounds such as trichloroethylene and non-solvent systems using selected ion exchange resins. Each of the cyclodextrins as well as mixtures thereof is commercially available. Beta-cyclodextrin is by far the most widely used form and is known for use in the production of pharmaceuticals and foods.

The property of cyclodextrin molecules that makes them useful for the present invention is that the molecule has an apolar, hydrophobic cavity which can contain hydrophobic molecules called guest molecules (or the hydrophobic portions of amphiphilic molecules) of appropriate sizes to fit inside the cavity and thus form inclusion complexes. One would therefore be led to believe that polar solvents would not have a sufficient affinity for the cavity and would not displace the more hydrophobic guests. In the search for a compatible, nondestructive, liquid or meltable carrier for the cyclodextrin complexes it has been found that most polar solvents, e.g., the hydroxy and polyhydroxy solvents, e.g., low molecular weight alcohol, ethylene glycol, 1,2-propanediol, glycerol and molten sorbitol, at least partially decompose the inclusion complexes and release some of the guest molecules. Surprisingly, it is now found that some liquid or meltable solids, as described hereinafter, can be used to make pumpable, fluid slurries of cyclodextrin complexes at typical process temperatures, e.g., at about 100–120° C. or lower, without decomposing the cyclodextrin complexes.

Because of this property of the cyclodextrin to form complexes with hydrophobic species, hydrophobic moieties of associative thickeners can bind (get capped) with CDs. The binding of cyclodextrin compounds with the hydrophobic moieties of associative thickeners disrupts the intermolecular hydrophobic associations and causes a suppression of the viscosity of an aqueous solution containing the associative thickener. The cyclodextrin compounds can then be readily dissociated or decomplexed from the associative thickener by the addition of another material which has a greater affinity for the cyclodextrin or by dilution with water.

The beta-cyclodextrin and its ethoxylated and propoxylated derivatives are useful in latex paint formulation for achieving a variety of effects, such as for example: to permit the preparation and supply of a low viscosity, high solids solution of the thickener without the use of viscosity suppressing solvent; improving the ease of incorporating hydrophobically modified associative thickeners, having marginal solubility in water, into aqueous systems; to reduce the viscosity drop of associative thickeners containing formulations upon the addition of colorants or surfactants to the formulation; to improve the efficiency of the associative thickener itself, thus reducing the thickeners required to reach a given paint viscosity; to reduce foaming in a paint, with or without an associative thickener, which is especially desirable when the paint is to be applied by a roller; and to reduce the color development problems caused by surfactants in some formulations.

Materials that have an affinity for the cyclodextrin and that cause the decomplexing or desorbing of the cyclodextrin from the hydrophobically modified polymers are described in U.S. Pat. Nos. 5,627,232, 5,629,373, 5,914,373 and WO 01/12712 and U.S. Pat. Nos. 4,288,639, 4,354,956, 4,354,956, 4,411,819, 4,673,518, 4,904,466, 5,728, 895, 5,880,222, 5,916,935, and 6,057,388 and WO 01/2712 are surfactants (i.e., nonionic, cationic, and anionic). These surfactants are readily available in latex formulations. Other solvents that have an affinity for cyclodextrin are hydroxyl-containing materials such as alcohols. Ethanol is a good example of such an alcohol.

According to the present invention, normally the lower limit of the solids content of the hydrophobically modified aminoplast polyethers or non-urethane polymer associative thickeners in the composition is 3% by weight of the composition, preferably 7%, and more preferably 10%. The upper limit of the thickener polymer solid content is 50% by weight, preferably 25% by weight, and more preferably 20% by weight. Generally, the cyclodextrin content lower limit is 0.2% by weight based on the total weight of the composition, preferably 0.5% by weight, and more preferably 0.7% by weight. The upper limit of the cyclodextrin is generally 7.0% by weight, preferably 3.0%, by weight, and more preferably 1.5% by weight or as dictated by the solubility of the given cyclodextrin at a given temperature and pH.

According to the present invention, in aqueous solutions containing low concentrations of hydrophobically modified aminoplast polyethers or non-urethane polyether associative thickeners, for example on the order of about 3% by weight, it was found that the unmodified cyclodextrins, including beta-cyclodextrin, are effective viscosity suppressing additives, while in aqueous solutions containing high concentrations of hydrophobically modified aminoplast polyethers or non-urethane polyether associative thickeners, for example on the order of greater than about 10% by weight, it was found that the modified cyclodextrins, having increased water solubility on the order of about 50 grams per 100 grams water, are preferred.

In accordance with this invention, the amount of the cyclodextrin species needed to form a target solution depends on the type of hydrophobically modified aminoplast polyethers or non-urethane polyether associative thickeners, its concentration in solution and the type of cyclodextrin used to suppress the solution viscosity. Cyclodextrin or cyclodextrin derivatives having water-solubility greater than 0.1% can be used to practice the present invention. Examples of water-soluble cyclodextrin derivatives include methylated, hydroxyethylated, hydroxypropylated, carboxymethylated, and diaminoethylated cyclodextrins. The cyclodextrin derivatives can be nonionic, cationic and anionic. Cyclodextrins or cyclodextrin derivatives having high binding constants for the hydrophobes present in the hydrophobically modified polymers are preferred ones as they efficiently lower the solution viscosity. Other hydrophilic cyclic molecules, such as calixarenes, having hydrophobic cavity and ability to complex with the hydrophobes of associative thickeners can also be used.

In accordance with this invention, the hydrophobically modified aminoplast polyethers or non-urethane polyether associative thickeners compositions can be used in film forming coating compositions such as latex paints, the pigment volume concentration (PVC) of the latex paint can have a lower limit of 15, preferably 24, and more preferably 35%. The upper limit of the PVC is normally 85, preferably 65%. According to the jargon of the paint industry, when the latex paint is a high gloss paint, the PVC is from about 15% to about 30%; when the paint is a semi-gloss paint, the PVC is from about 20 to about 35%; and when it is a flat paint, the PVC is from about 40 to a bout 80%. Also, for latex paints, the ICI viscosity (as measured by ICI cone and plate viscometer) should be above about 1.5 poise at 25° C., for good performance.

Besides the latex, waterborne latex paint contains pigments, fillers, surfactants, cosolvents, and thickeners. Other additives that can be included in paint formulations, for example, are biocides, dispersants, coalescing agents, preservatives, defoamers, and wet-edge agents

EXAMPLES

Hydrophobically modified aminoplast polyethers are marketed by Sud-Chemie Rheological group Inc. under the trade mark Optiflo® rheology modifier. Non-urethane polyether type associative commercial thickeners are marketed by Rheox, Inc. and Cognis Corporation under the trade marks Rheolateg rheology modifier and DSX rheology modifier respectively. Commercial samples of these products were obtained from these suppliers. They are all nonionic synthetic associative thickeners used in paints to achieve high high-shear viscosity (ICI viscosity), good flow and leveling and desired gloss.

Standard Procedure to Measure the Solution Viscosity of the Associative Thickener in the Presence of β-CD To 100 g of the polymer solution was added a known amount of β-CD and the resulting mixture mixed. When the β-CD dissolved, the solution was placed in a thermostat, set at 25±0.5° C., for 2 hours and then the viscosity was measured using a Brookfield viscometer.

Example 1

Study of the Solution Viscosity of Optiflo® L100 in the Presence of β-CD

Optiflo L100 product is a 20% solids solution of a hydrophobically modified aminoplast-polyether (Mw~86,700; Mn~17,500) sold by Süd-Chemie Rheologicals Group. Its solution viscosity is ~3000–3500 cps. The exact chemical structure of the polymer(s) present in Optiflo L100 is not known.

According to descriptions in U.S. Pat. Nos. 5,629,373, and 5,914,373, aminoplast-polyether copolymers are made by condensation reaction of a polyfunctional aminoplast with a bifunctional polyether in the presence of an acid catalyst. Aminoplast reagents are condensation products of an aldehyde (formaldehyde) with amines, such as melamines, ureas, benzoguanamines, and glycolurils. The hydrophobes are incorporated into the copolymer backbone by coreacting the bifunctional polyether and an ethoxylated alkyl/aryl phenol with the aminoplast.

Note that the commercial aminoplast may contain a small amount of dimer and oligomeric products and the reaction of the aminoplast with the polyether and ethoxylated surfactant is random. Hence, a mixture of products is formed when an aminoplast is condensed with a polyether and an ethoxylated surfactant. The reaction mixture could thus contain polymer chains containing pendant as well as terminal hydrophobes.

It was found that the solution viscosity of Optiflo L100 product gradually decreased with increasing the amount of β-CD. The results are shown below in Table 1.

TABLE 1

Amount of β-CD versus solution viscosity of Optiflo L100 rheology modifier

| Amount (g) of β-CD per 100 g of Optiflo L100 | Solution BF viscosity (cps) |
| --- | --- |
| 0 | 3052 |
| 0.2 | 2556 |
| 0.4 | 2212 |
| 0.6 | 1976 |

TABLE 1-continued

Amount of β-CD versus solution viscosity of Optiflo
L100 rheology modifier

| Amount (g) of<br>β-CD per 100 g of Optiflo L100 | Solution BF viscosity (cps) |
|---|---|
| 0.8 | 1880 |
| 1.0 | 1844 |
| 1.2 | 1816 |
| 1.4 | 1660 |
| 1.5 | 1472 |

The results show that the hydrophobe present in Optiflo L100 complexes with β-CD leading to reduced solution viscosity. In other words, Optiflo L100 solution viscosity decreased in the presence of β-CD and could have a solution viscosity of <2000 cps in conjunction with 0.6 wt % of β-CD.

Example 2

Study of the Solution Viscosity of DSX-2000 in the Presence of β-CD

DSX-2000 is a 40% solids solution of a nonurethane associative thickener (Mw~33,000; Mn~13,000) in a 1:2 butyl carbitol/water mixture. It is available from Cognis Corporation.

To study the interaction of the polymer present in DSX-2000 product with β-CD, the solid polymer was recovered by evaporation of solvent. Since DSX-2000 product contains butyl carbitol, the solid polymer was first isolated by evaporation of solvent at room temperature. Then high solids solutions of the isolated polymer were made by dissolving the appropriate amount of the polymer in water. β-CD was obtained from Cerestar USA, Inc. (Hammond, Ind.) and used as is. A 30.8% solids solution of the polymer in water was made. The viscosity of this solution in the presence of various amounts of β-CD was measured. The results are shown in Table 2.

TABLE 2

Amount of β-CD versus 30.8% solids solution viscosity
of the polymer present in DSX-2000

| Amount (g) of β-CD<br>per 136 g of 30.8% solids<br>solution of the DSX-2000 polymer | Solution BF viscosity (cps) |
|---|---|
| 0 | 1424 |
| 0.2 | 1348 |
| 0.4 | 1292 |
| 0.6 | 1260 |
| 0.8 | 1228 |
| 1.0 | 1216 |

As can be seen from above data, the 30% solution Brookfield viscosity of the DSX-2000 polymer decreased in the presence of β-CD.

What is claimed is:

1. A composition comprising
    a) a hydrophobically modified aminoplast polyether or a hydrophobically modified non-urethane polyether product and
    b) a viscosity suppressing agent selected from the group consisting of cyclodextrins and derivatives thereof, wherein the lower limit of the solids content of the polymer is 10 wt %.

2. The composition of claim 1, wherein the cyclodextrins are selected from the group consisting of alpha (α), beta (β), and gamma (γ) cyclodextrins.

3. The composition of claim 1, wherein the cyclodextrin derivatives are selected from the group consisting of methylated, hydroxyethytated, hydroxypropylated, carboxymethylated, and diaminoethylated cyclodextrins.

4. The composition of claim 1, wherein the lower limit of the hydrophobe types has 8 carbons.

5. The composition of claim 1, wherein the lower limit of the hydrophobe types has 10 carbons.

6. The composition of claim 1, wherein the lower limit of the hydrophobe types has 12 carbons.

7. The composition of claim 1, wherein the upper limit of the hydrophobe types has 40 carbons.

8. The composition of claim 1, wherein the upper limit of the hydrophobe types has 28 carbons.

9. The composition of claim 1, wherein the upper limit of the hydrophobe types has 18 carbons.

10. The composition of claim 1, wherein the upper limit of the solids content of the polymer is 50 wt %.

11. The composition of claim 1, wherein the upper limit of the solids content of the polymer is 25 wt %.

12. The composition of claim 1, wherein the upper limit of the solids content of the polymer is 20 wt %.

13. The composition of claim 1, wherein the lower limit of the cyclodextrin content is 0.2 wt %.

14. The composition of claim 1, wherein the lower limit of the cyclodextrin content is 0.5 wt %.

15. The composition of claim 1, wherein the lower limit of the cyclodextrin content is 0.7 wt %.

16. The composition of claim 1, wherein the upper limit of the cyclodextrin content is 7.0 wt %.

17. The composition of claim 1, wherein the upper limit of the cyclodextrin content is 3.0 wt %.

18. The composition of claim 1, wherein the upper limit of the cyclodextrin content is 1.5 wt %.

19. The composition of claim 1, wherein the solids content of the polymer is 20 wt % and the cyclodextrin content is 1.0 wt %.

20. The composition of claim 1, wherein the solids content of the polymer is 17 wt % and the cyclodextrin content is 3.0 wt %.

21. A process for preparing the composition of claim 1 comprising dry blending a hydrophobically modified aminoplast polyether or hydrophobically modified non-urethane polyethers with cyclodextrin.

22. The process of claim 21, wherein the blend is heated to fuse the materials together to form a solid mass.

23. The process of claim 21, wherein the cyclodextrin is selected from the group consisting of alpha (α), beta (β), and gamma (γ) cyclodextrins and mixtures thereof.

24. The process of claim 23 wherein the viscosity suppressing agent is selected from the group consisting of methylated, hydroxyethylated, hydroxypropylated, carboxymethylated, and diaminoethylated cyclodextrins and mixtures thereof.

* * * * *